United States Patent
Robinson et al.

[11] Patent Number: 5,908,164
[45] Date of Patent: *Jun. 1, 1999

[54] METHOD AND APPARATUS FOR SEPARATING AND RECOVERING FRACTIONAL COMPONENTS OF CARPET

[76] Inventors: Forrest L. Robinson, 12913 Woodson Dr., Overland Park, Kans. 66209; Willis R. Campbell, 14129 Locust St., Olathe, Kans. 66062

[21] Appl. No.: 09/103,922

[22] Filed: Jun. 24, 1998

Related U.S. Application Data

[60] Provisional application No. 60/052,137, Jul. 10, 1997.

[51] Int. Cl.⁶ .................................................. B02C 19/12
[52] U.S. Cl. ...................... 241/19; 241/24.19; 241/24.21
[58] Field of Search ............................ 241/5, 14, 24.21, 241/24.19, DIG. 38, 19, 29

[56] References Cited

U.S. PATENT DOCUMENTS

| | | | |
|---|---|---|---|
| 3,794,251 | 2/1974 | Williams | 241/65 |
| 5,236,132 | 8/1993 | Rowley, Jr. | 241/5 |
| 5,513,805 | 5/1996 | Fisher et al. | 241/18 |
| 5,515,188 | 5/1996 | Sharer | 241/14 |
| 5,535,945 | 7/1996 | Sferranza et al. | 241/24.12 |
| 5,722,603 | 3/1998 | Costello et al. | 241/20 |
| 5,727,740 | 3/1998 | Robinson et al. | 241/20 |

*Primary Examiner*—Joseph J. Hail, III
*Assistant Examiner*—William Hong

[57] ABSTRACT

A process is disclosed for the separation and recovery of fractional components of used carpet. Although the disclosed process is operable with either jute-backed or vinyl-backed carpet, an alternative process is preferred for vinyl-backed carpet to permit the sequential removal of the vinyl backing with most of the fiberglass stabilizer intact. The process includes the pre-cutting and preferable pre-soaking of the used carpet into appropriate sized pieces, followed by the introduction of the pre-conditioned used carpet pieces into a cyclonic comminuter which reduces the carpet pieces into fractional components. Processes for the recovery of the separated fractional components include collecting the components from the respective discharges from the cyclonic comminuter, washing, and separating by carding, static charges, pressure gradients and the like. This effective process will allow for greater utilization of carpet recycling operations to prevent used carpet from being disposed in land fills.

20 Claims, 5 Drawing Sheets

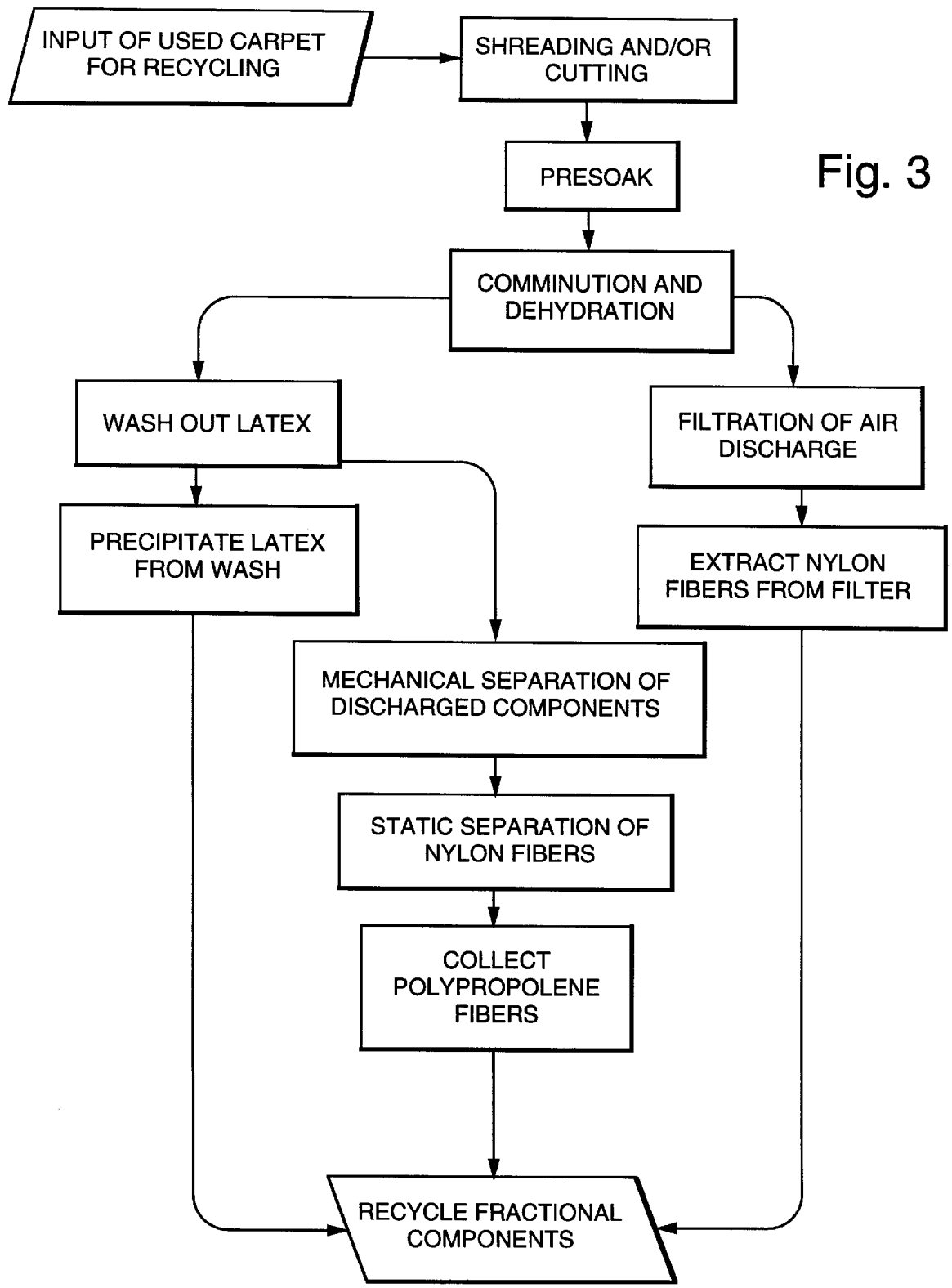

METHOD AND APPARATUS FOR SEPARATING AND RECOVERING FRACTIONAL COMPONENTS OF CARPET

This application claims benefit of USC Provisional Appl. 60/052,137, filed Jul. 10, 1997.

BACKGROUND OF THE INVENTION

This invention relates generally to the comminution, separation, recovery and recycling of fractional components of carpet by a process utilizing a cyclonic comminuter.

Carpet recycling has presented a major challenge to the carpet industry that has not been adequately satisfied. The lack of effective recycling processes has resulted in a large volume of carpet material being sent to the landfill. Carpet material is largely non-biodegradable, which is an undesirable situation for the landfills. Furthermore, it is difficult to separate the fractional components of carpet without resulting in the destruction of the components, which limits re-cycling opportunities. A process that would permit the effective recycling of carpet components would require that the fractional components not be destroyed so that the recovered components can be re-manufactured into quality carpet.

Carpet is manufactured in two general configurations, defined by the backing material, although each of the backing materials is formulated in various forms. These two general classifications of carpet backing are jute and vinyl (which is also referred to as rubber-backed carpet). Jute-backed carpet is manufactured with a top layer of nylon 6 or nylon 6-6, or a mixture of these two nylon fibers. These nylon fibers are woven into strings that are affixed to the backing to present the layer on which the carpet is walked upon. The backing includes polypropylene fibers which are substantially coarser in shape and larger in size than the nylon fibers.

The polypropylene fibers are used to hold the woven nylon strings in place and to fasten the entire matrix of fibers to the backing. Jute, being the primary fiber in burlap, is a glossy plant fiber grown primarily in India. A bonding agent, such as latex, is used to stabilize the jute backing to the polypropylene and, therefore, to the nylon fibers. A weaving process hold the respective fractional components of the carpet together, but the latex bonding agent is the stabilizer. Generally, the latex bonding agent/stabilizer is water soluble.

Vinyl backed carpet, also referred to as rubber-backed carpet, is manufactured similarly to the jute-backed carpet, except for the backing thereof. The vinyl may or may not have a stabilizing agent associated therewith, but generally, fiberglass fibers are utilized as a stabilizer. The bonding of the vinyl backing to the other fractional components of the carpet is typically accomplished through a heat process or through the use of a bonding agent, or both.

Accordingly, a process, method and apparatus for separating, recovering and recycling the fractional components of carpet would provide a substantial improvement over the known prior art processes for disposing of used carpet. Not only would landfill charges be saved, but the recovered fractional components of the carpet have substantial value for the re-manufacture of quality carpet.

SUMMARY OF THE INVENTION

It is an object of this invention to provide a process to reduce used carpet into component fractions to facilitate the recycling of used carpet.

It is a feature of this invention that used carpet can be recycled in an economical manner.

It is an advantage of this invention that the recycling of used carpet will reduce the amount of used carpet being disposed in landfills.

It is another object of this invention to utilize a cyclonic comminuter to reduce used carpet pieces into component fractions.

It is still another object of this invention to provide a process for recycling used carpet.

It is another feature of this invention that the used carpet is first pre-cut into appropriately sized pieces before being fed into a cyclonic comminuter.

It is another advantage of this invention that pre-soaking the used carpet pieces will enhance the reduction of the carpet into fractional components within the cyclonic comminuter.

It is still another feature of this invention that the process will be operable for both jute-backed and vinyl-backed carpets.

It is yet another feature of this invention that the final separation of the fractional components of the used carpet pieces can be accomplished by proven operations, such as carding, static charges or pressure gradients.

It is yet another object of this invention to provide a process for recycling used vinyl-backed carpets that utilizes sequential comminuting operations to remove only the vinyl backing from the carpet pieces without any significant disruption of the remaining fractional components of the carpet pieces.

It is a further feature of this invention that the first comminuting operation for recycling vinyl-backed carpet is set at a relatively low level so that the extent of comminution removes only the vinyl backing.

It is a further advantage of this invention that the incomplete comminution of the first comminuting operation of the used carpet pieces leaves most of the fiberglass stabilizer intact with the vinyl material to facilitate the removal of the fiberglass stabilizer as a fractional component.

It is a further object of this invention to provide a process for recycling used carpet for separating and recovering fractional components of the used carpet, including the steps of:

(a) conditioning the used carpet by reducing the carpet to pieces of a pre-determined range of sizes;

(b) feeding the reduced carpet pieces into an air flow of a cyclonic dehumidifying comminuter to separate the fractional components of the carpet pieces to create a mass of separated, entwined fractional component fibers discharged from a discharge opening of said comminuter;

(c) filtering the air flow after being exhausted from the comminuter through a filtering mechanism to recover fractional component fibers carried out of the comminuter with the air flow;

(d) passing the mass of entwined fractional component fibers through a separating mechanism to separate the entwined fractional component fibers from the mass discharged from the comminuter; and (e) collecting the fractional component fibers from the filtering mechanism and the separating mechanism.

It is a further object of this invention to provide a process for the separating and recovery of fractional components of used carpet to facilitate the recycling thereof which is inexpensive in operation, and simple and effective in use.

These and other objects, features, and advantages are accomplished according to the instant invention by providing a process for the separation and recovery of fractional components of used carpet. Although the disclosed process is operable with either jute-backed or vinyl-backed carpet, an alternative process is preferred for vinyl-backed carpet to permit the sequential removal of the vinyl backing with most of the fiberglass stabilizer intact. The process includes the pre-cutting and preferable pre-soaking of the used carpet into appropriate sized pieces, followed by the introduction of the pre-conditioned used carpet pieces into a cyclonic comminuter which reduces the carpet pieces into fractional components. Processes for the recovery of the separated fractional components include collecting the components from the respective discharges from the cyclonic comminuter, washing, and separating by carding, static charges, pressure gradients and the like. This effective process will allow for greater utilization of carpet recycling operations to prevent used carpet from being disposed in land fills.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a process flow chart for the method of comminuting, separating and recovering fractional components of carpet for recycling thereof utilizing a single comminuting/dehydrating machine, as schematically depicted in FIG. 1.

DETAILED DESCRIPTION OF THE PREFERRED EMBODIMENT

Figure 1:
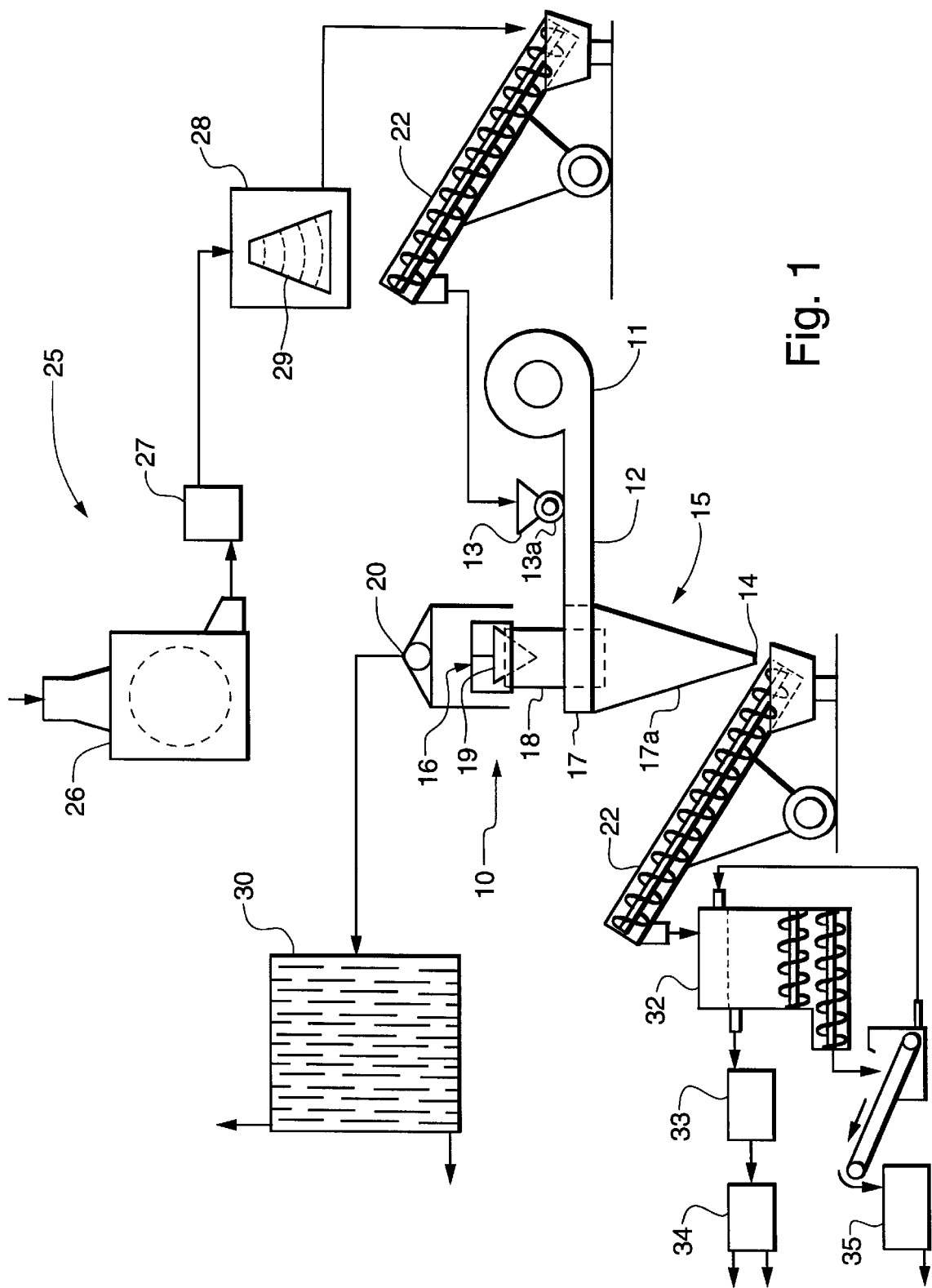
FIG. 1 is a schematic view of apparatus for accomplishing the comminution, separation and recovery of carpet utilizing only a single pass through a comminuting/dehydrating machine, particularly for the recycling of jute-backed carpet.

Comminuting dense material through a cyclonic comminuting/dehydrating machine, such as shown in U.S. Pat. No. 3,794,251, issued on Feb. 26, 1974, for a "Material Reducing System and Apparatus", is well known in the art. A cyclonic comminuting/dehydrating machine similar to that disclosed in U.S. Pat. No. 5,236,132, is schematically depicted in FIGS. 1–3. The descriptive portions of the aforementioned U.S. Pat. No. 3,794,251 and U.S. Pat. No. 5,236,132 are incorporated herein by reference, particularly with respect to the manner and mechanism through which a cyclonic comminuting/dehydrating machine operates.

Such a cyclonic comminuting/dehydrating machine 10 operates to create a high velocity stream of air from a blower 11 that is directed through a conduit 12 into an inverted conical housing 15. The stream of air is directed into a tornado-like swirling motion within the housing 15 before being discharged out the exit opening 16 at the top center portion of the housing 15. A damper 19 controls the flow of air through the air exit opening 16 and the depth of the swirling motion of the air within the housing 15.

A cylindrical sleeve 18, co-operable with the damper 19, is axially movable within the housing 15 to also control the depth of cyclonic comminution of material within the housing 15. The positioning of the sleeve 18 deep into the housing 15 provides for greater comminution of the material fed through the conduit 12, while a shallow penetration of the sleeve 18 into the housing allows for a more rapid exit of the swirling air from the housing 15 through the air exit opening 16 and, therefore, provides only minimal comminution of the material.

A discharged air recovery mechanism 20 captures the discharged stream of air from the air exit opening 16 to prevent the discharge of any fractional components within the discharged air into the atmosphere to control pollution and allow the recovery of any fractional component therein, as will be discussed in greater detail below. A material infeed hopper 13 meters the flow of material into the air stream in the conduit 12 so that the material to be comminuted enters the housing 15 with the stream of air from the conduit 12. Preferably, the infeed hopper 13 includes an air lock 13a having a rotational member that limits the escape of air from the conduit 12 while feeding material into the conduit 12 for flow into the housing 15.

The housing 15 includes a cylindrical portion 17 that receives the air stream, and material flowing therein, from the conduit 12 and directs the air stream into a swirling motion within the housing 15. Depending immediately below the cylindrical portion 17 is a conical portion 17a that directs the swirling air flow into decreasing-radius turns until the air can escape up through the sleeve 18, past the damper 19 and into the discharged air recovery mechanism 20. The conical portion 17a terminates in a material discharge opening 14 at its lowermost extremity for the discharge of comminuted material from the housing 15.

The cylindrical portion 17 is lined with hardened steel rasp bars (not shown) that, coupled with the differential forces associated with the tornado-like swirling motion of the air stream within the housing 15, serve to comminute material fed therein through implosion, impaction and centrifugal force, on the basis of quantity and density of the material fed therein. At least the upper areas of the conical portion 17a preferably also have spirally arranged members (not shown) that assist in the comminution of material within the housing 15 and deflect material upwardly toward the cylindrical portion 17 to further the comminuting process.

For example, if a bucket of limestone rocks were fed into the housing 15 through the infeed hopper 13, the rocks would be pulverized into small pieces that would drop by gravity through the material discharge opening 14 formed by truncating the end of the inverted conical housing 15. Similarly, a bucketful of steel bolts fed into the housing 15 would also be pulverized into small pieces. If, however, a handful of steel bolts were fed into the air stream with a bucket of limestone rocks, the rocks would still be pulverized, but the steel bolts would be discharged through the material discharge opening 14 substantially unharmed.

The operation of the rasp bars lining the cylindrical portion 17 of the housing 15 serve both to shred and to ricochet solid material particles within the housing 15, which impacts other solid material particles and, coupled with differential velocities of the swirling air within the housing 15, serves to comminute the lesser dense material within the housing 15. Accordingly, with respect to the examples of the limestone rocks and steel bolts given above, the less dense and higher quantity limestone rocks become comminuted into small pieces, while the steel bolts become discharged relatively unharmed.

In Applicants' U.S. Pat. No. 5,727,740, granted on Mar. 17, 1998, the descriptive portions thereof being incorporated herein by reference, method and apparatus for recovering precious stones from soil is disclosed, along with processes for reclaiming precious metals from low grade ore and waste material, recovering lead and lead shot from contaminated soils, and for removing free sulphur from coal. All of these processes involve dense materials or pellets of material having greater density within a lower density medium that needs to be disintegrated and recovered.

Surprisingly, a cyclonic, dehumidifying comminuting machine 10 similar to that described and shown in the aforementioned U.S. Pat. No. 5,236,132, has been found to be operable to disintegrate pieces of considerably less dense material such as carpet. By controlling the level of comminution within the housing 15 through manipulating the depth of the sleeve 18 into the housing 15 and the operation of the damper 19, the amount of comminution of the carpet pieces can be selectively controlled. This control permits the development of processes that can recover the fractional components of both jute-backed and vinyl-backed carpets.

Figure 4:
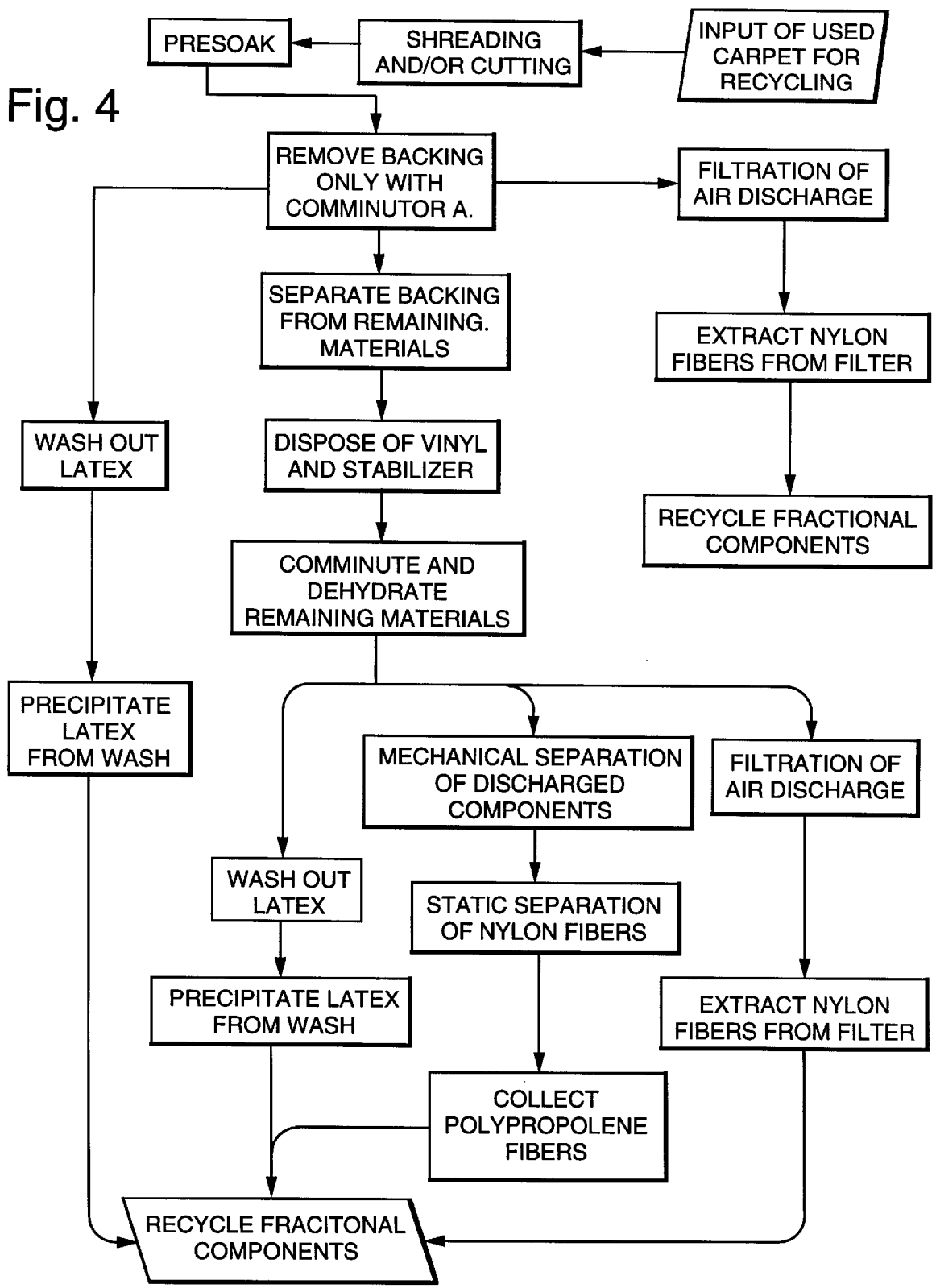
FIG. 4 is a process flow chart for the method of comminuting, separating and recovering fractional components of carpet for recycling thereof utilizing sequential comminuting/dehydrating machines, as schematically depicted in FIGS. 2A and 2B.

Referring first to FIG. 1, the apparatus for recovering fractional components of carpet, particularly jute-backed carpet can best be seen. The process flow chart is depicted in FIG. 4. While this disclosed process is considered to be particularly applicable to jute-backed carpet, the separation and recovery of vinyl-backed carpet can also be accomplished with this process. Utilizing the cyclonic, dehumidifying comminuter 10 as the central machine in the process, both pre-comminuting and post comminuting devices are necessary for the efficient separation and recovery of the fractional components of carpet.

Used carpet must be pre-cut into pieces having a size and shape suitable for the feeding of the carpet pieces through the material infeed hopper 13. While the size of the comminuter 10 and the size of the air lock 13a will dictate the size and shape of the carpet pieces to be pre-cut, it has been found that pre-cutting the used carpet into squares having sides measuring between one and four inches will provide satisfactory results. It will be understood by one skilled in the art that this process is not confined to the use of carpet pieces in either this size or particular shape. Pre-cutting machinery 25 can include a conventional hammer mill 26 that can break up or chop the used carpet into pieces having the size and shape needed to permit feeding through the air lock 13a. Alternatively, a shredding and cutting apparatus 27 can be used to first cut the used carpet into strips and then into squares of an appropriate size.

After pre-cutting the used carpet into appropriately sized pieces, it is advantageous to pre-soak the pieces in water, preferably with agitation. Pre-soaking enhances the separation of the component fibers of the carpet in the comminuter, particularly with jute-backed carpets. The pre-soaking of the carpet pieces starts to break down the latex backing of the carpet before being introduced into the comminuter 10. Agitation helps to reduce the soak time needed for the carpet pieces and, therefore, the incorporation of an agitator 29 may reduce the size of the pre-soak tanks 28.

It will be recognized by one skilled in the art that not all of these pre-comminution steps, and the machinery associated therewith will be necessary for each of types of carpet to be processed. For example, both a hammer mill 26 and a shredding/cutting machine 27 are not typically necessary; however, a hammer mill 26 and a simple cutting machine might provide the best results, depending on the settings of the hammer mill 26. Furthermore, pre-soaking is not mandatory to the process, but does enhance the operation. With the use of a cyclonic, dehumidifying comminuter 10, the water is removed during the comminution step anyway.

Following the pre-cutting and pre-soaking of the carpet pieces, the carpet pieces are loaded into the material infeed hopper 13 through the air lock 13a to be fed into the air stream forced through the conduit 12. In FIG. 1, an auger conveyor 22 schematically represents a mechanism for transporting the pre-cut and pre-soaked carpet pieces to the infeed hopper 13. The carpet pieces then flow into the cylindrical portion 17 of the housing 15 to start the comminuting and dehydrating step in the process during which the fractional components of the carpet is separated. The carpet pieces are converted into a mass of fibers and powder. The nylon fibers are detached from the polypropylene fibers, etc., but are entwined together in the discharge of materials through the discharge opening 14.

In the case of jute-backed carpet, the latex will fall out the discharge opening 14 as dry powder, while the jute will typically be discharged as both a dry powder and in a fibrous form. Because the cyclonic dehumidifying comminuter 10 both comminutes and dehydrates, the water absorbed by the carpet pieces during the pre-soak stage of the process is completely removed and is discharged with the air flow through the sleeve 18 into the discharged air recovery mechanism 20. Some of the lighter nylon fibers may also be trapped in the air flow and exit the comminuter 10. Accordingly, the discharged air recovery mechanism 20 will direct the flow of discharged air into a filtering mechanism 30 where the nylon fibers can be extracted from the air stream and recovered.

Final separation of the entwined fractional carpet components occurs after being discharged from the conical portion 17a of the housing 15 through the discharge opening 14. The entwined materials are conveyed to a wash bath 32 to remove the powdery latex, which is water-soluble. Some of the nylon fibers will float to the top of the wash bath 32 and will be removed by a recovery device 33, such as a static precipitator or screening mechanism, with the bath water to be recovered. The latex can be precipitated from the bath water either chemically or by filtering through a precipitator 34 and also recovered before the water is discharged or recirculated back through the wash bath. Materials exiting the wash bath 32 can receive a final rinse before being conveyed to a carding apparatus 35. This water can be recirculated back into the wash bath tank 32.

The nylon and polypropylene fibers that are still entwined after being discharged from the wash bath tank 32 are conveyed to a carding apparatus 35 to effect separation of the component materials. The entwined nylon and polypropylene fibers can be separated in the carding apparatus 35 by a combing process, commonly referred to as "carding", or by the use of static charges, or by a combination of both. Separation of these fibers can also be accomplished by using air or a washing process either alone or in combination with carding or static charges. Carding also aligns all the fibers so that they are oriented in the same direction, thus allowing the heavier materials, such as the polypropylene fibers, to drop out of the mass or to be removed by static charges or pressure gradients or both. The separated materials can then be recovered and re-utilized in the manufacturing of new carpet.

Vinyl-backed carpet can also be separated into its fractional components and the components recovered for recycling by the above-described process. The problem encountered by using this process to recover vinyl-backed carpet components is that the full comminution of the carpet pieces also comminutes and separates the vinyl backing and the fiberglass fibers that are used as a stabilizer. Freeing fiberglass fibers, whether carried up through the sleeve 18 to be recovered in the filtering mechanism 30 or allowed to fall through the discharge opening 14 at the bottom of the comminuter 10, is not desirable. The preferred process for recycling vinyl-backed carpet is described below with respect to FIGS. 2, 3 and 5.

Figure 2A:
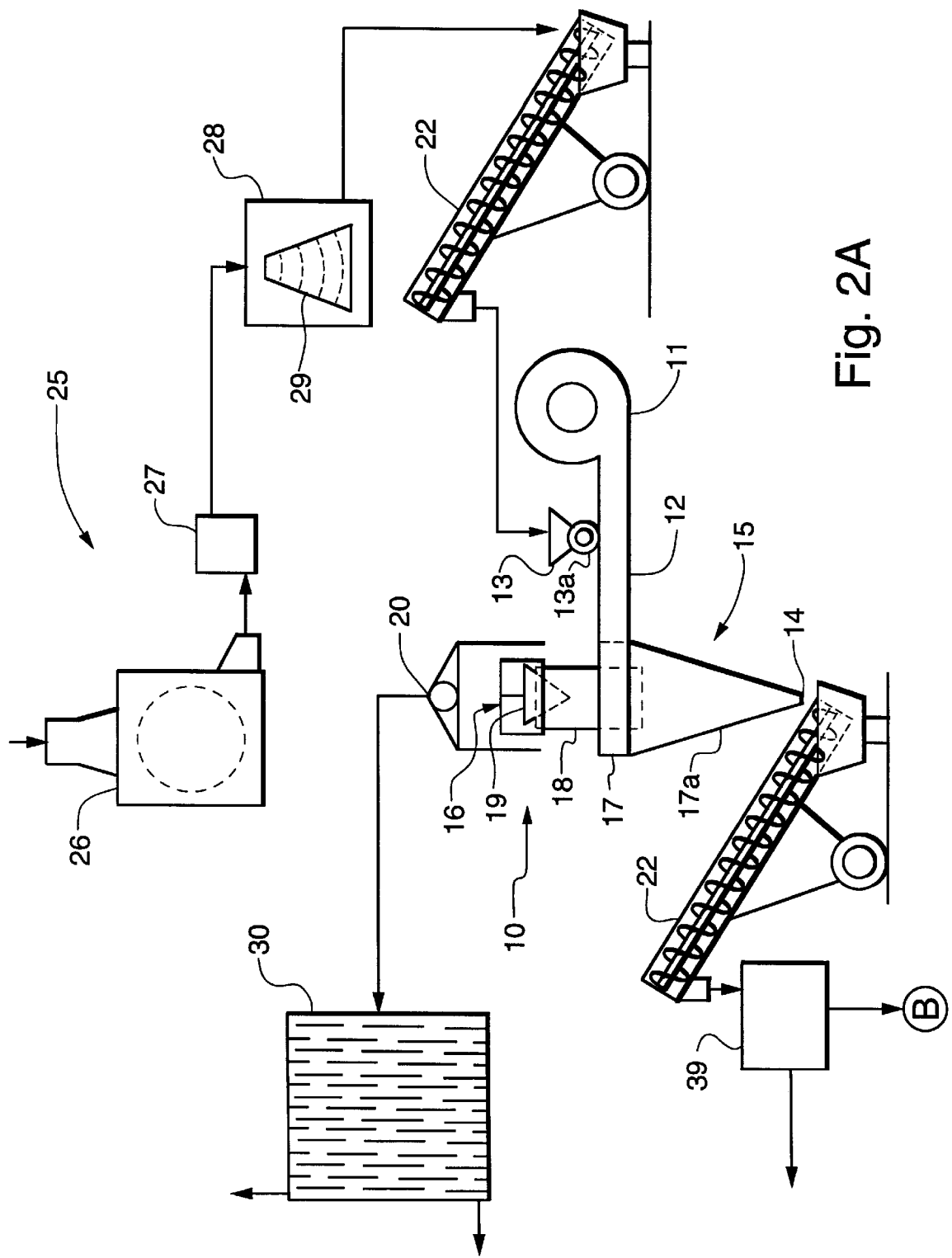
FIG. 2A is a schematic view of apparatus corresponding to the first comminuter/dehydrator for accomplishing the comminution, separation and recovery of carpet utilizing sequential comminuting/dehydrating steps, particularly for the recycling of vinyl-backed carpet.

Referring now to FIG. 2A, the first phase of the process is substantially the same as described above with respect to FIG. 1. The used carpet is selectively pre-conditioned before being fed into the first comminuter 10, such as by shredding or cutting the carpet into appropriate sized pieces and by pre-soaking. Even though vinyl-backed carpet does not use latex as a stabilizer, the absorption of water into the carpet pieces is still believed to enhance the subsequent comminution process; however, pre-soaking of vinyl-backed carpet is not a necessary step in the process.

The carpet pieces are then fed into the first cyclonic dehumidifying comminuter through the air lock 13a and into the air stream flowing through the conduit 12. The primary difference between this first phase of separating vinyl-backed carpet and the process above for recycling primarily jute-backed carpet is the comminution setting on the first comminuter 10. Preferably, the sleeve 18 is withdraw to a shallow setting within the housing 15 and the damper 19 is set so that the extent of comminution is set at a relatively low level so that only the vinyl backing is removed from the carpet pieces without any significant disruption of the remaining fractional components of the carpet pieces.

Because the vinyl material is substantially heavier than the other carpet materials, the vinyl will settle out by gravity through the discharge opening 14 at the bottom of the conical portion 17a of the first comminuter. Generally, the vinyl material will come out of the first comminuter 10 in comparatively large pellets, which permit relatively easy separation of the vinyl materials from the remaining carpet. A separating device 39, such as a sieve, screening apparatus, air stream or other appropriate devices, can be utilized to separate the vinyl from the remaining carpet materials. Because of the incomplete comminution of the carpet pieces, most of the fiberglass stabilizer remains intact with the vinyl.

Figure 2B:
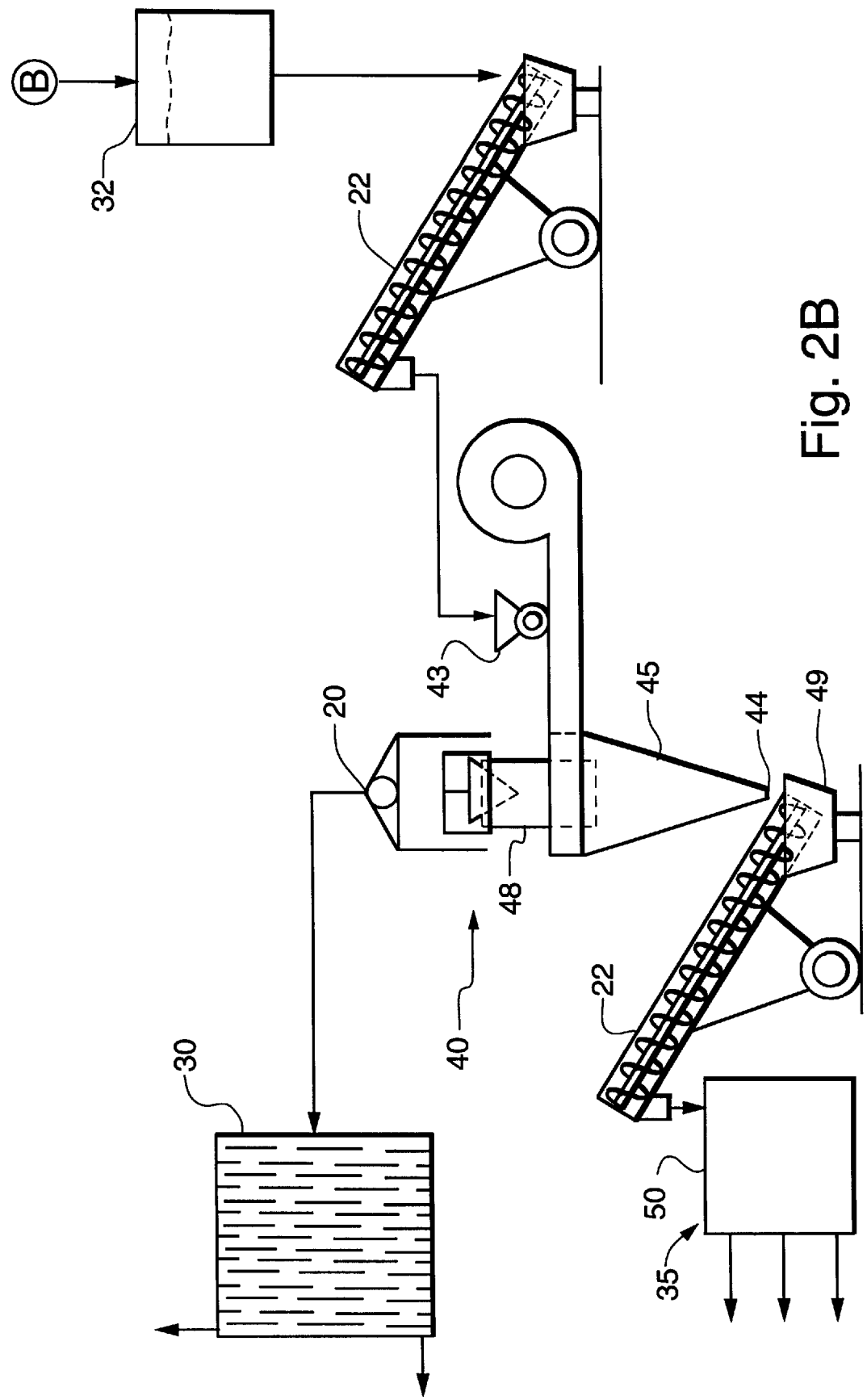
FIG. 2B is a schematic view of apparatus corresponding to the second comminuter/dehydrator for accomplishing the comminution, separation and recovery of carpet utilizing sequential comminuting/dehydrating steps, particularly for the recycling of vinyl-backed carpet.

Referring now to FIG. 2B, the remaining carpet material is then preferably washed in a secondary wash tank 32 to remove any powdery residue and to add additional moisture to the materials to enhance the further comminution thereof in the second cyclonic dehumidifying comminuter 40. Again a auger conveyor 22 symbolically depicts the conveyance of the remaining carpet materials from the wash tank 32 to the material infeed hopper and air lock 43 of the second comminuter 40 which is set for full comminution by lowering the sleeve 48 well into the housing 45.

The comminuting effect of the second cyclonic dehumidifying comminuter 40 is similar to the operation defined above with respect to FIG. 1. The nylon fibers are disengaged from the polypropylene fibers and are generally recovered in the filtering mechanism 30, which can be a shared filter with the first comminuter 10 or a separate device. The polypropylene fibers, along with some entwined nylon fibers, are discharged through the discharge opening 44 of the second comminuter 40 into a collection device 49, where the fibers are transported to a separating mechanism 50, which may including a carding apparatus or static or pressure gradient devices, as described above, to recover the polypropylene and nylon fibers.

Any remaining backing materials are reduced to powder and generally exit the discharge opening 44, but may be entrapped in the air flow for removal by the filtering mechanism 30. Accordingly, the separating mechanism 50 may require a tertiary bath to cleanse the polypropylene and nylon fibers. One skilled in the art will realize that the above described process utilizing first and second cyclonic dehumidifying comminuters 10, 40, can also be used for the recycling of jute-backed carpet pieces with most of the jute backing and latex stabilizer being removed in the first comminuter 10 and the remaining fibers recovered from the second comminuter 40.

In the alternative, it is believed that the fractional carpet components may be recovered in the comminuter before being discharged through the discharge opening. Because density of materials effects the path of each individual fractional component material inside of the comminuter 10, 40, such as the nylon 6-6 or nylon 6 or polypropylene fibers, separation of these materials can be accomplished inside of the comminuter by utilizing the density differences and centrifugal forces, or by the use of static electricity in the form of an electrostatic precipitator.

The lighter materials, such as the nylon fibers, can be brought out the top of the comminuter with the air flow and collected by the filtering mechanism 30. The heavier and larger materials, such as the polypropylene fibers will gravitate toward the discharge opening and can be collected before being discharged. The other heavier materials, such as the latex and vinyl components will be pulverized into a powder and allowed to exit the discharge opening.

Because of the potential volume of used carpet to be processed and the fractional components thereof to be recovered and recycled, it is expected that a typical processing plant will require several units, or multiples of units as described above, in order to process a substantial amount of carpet efficiently. In such an operation, many of the machinery components described above can be combined and constructed in a larger magnitude. For example, the filtering mechanism 30 can be constructed to process the air flow from several comminuters 10. Similarly, the pre-soak tanks 28 and the pre-cutting machinery 25 can be sized to accommodate the volume of carpet pieces that will satisfy the capability of multiple comminuters. The same order of magnitude would also apply to the post-comminuting machinery, such as the carding apparatus 35 and the wash bath tank 32.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A method of separating and recovering fractional components of carpet, comprising the steps of:

conditioning said carpet by reducing said carpet to pieces of a pre-determined range of sizes;

feeding said carpet pieces into an air flow of a cyclonic dehumidifying comminuter to separate the fractional components of said carpet pieces to create a mass of separated, entwined fractional component fibers discharged from a discharge opening of said comminuter;

filtering the air flow after being exhausted from said comminuter through a filtering mechanism to recovered fractional component fibers carried out of the comminuter with the air flow;

passing said mass of entwined fractional component fibers through a separating mechanism to separate the entwined fractional component fibers from said mass discharged from said comminuter; and collecting said fractional component fibers from said filtering mechanism and said separating mechanism.

2. The method of claim 1 wherein said passing step includes the step of:

combing the mass of entwined fractional component fibers through a carding mechanism.

3. The method of claim 2 wherein said conditioning step further includes the step of:

pre-soaking said carpet pieces in water before said feeding step.

4. The method of claim 3 wherein said feeding step includes the step of:

setting the comminuter to a full comminution level of action to obtain a full separation of said fractional components.

5. The method of claim 4 further comprising the step of:

before said passing step, washing said entwined mass of component fibers to remove any powdery residue therefrom.

6. The method of claim 3 wherein said feeding step includes the step of:

setting the comminuter to a minimal comminution level to effect only a separation of a backing material from the carpet pieces to create a remnant carpet material.

7. The method of claim 6 further including the steps of:

after said feeding step, collecting the remnant carpet material; and running said collected remnant carpet material through a second cyclonic dehumidifying comminuter set at a high comminution level to separate the fractional component fibers and create said mass of entwined component fibers.

8. A method of separating and recovering fractional components of vinyl-backed carpet, comprising the steps of:

conditioning said carpet by reducing said carpet to pieces of a pre-determined range of sizes;

feeding said carpet pieces into an air flow of a first cyclonic dehumidifying comminute set at a low comminution level to effect only a separation of a backing material and stabilizer material from the carpet pieces to create a first remnant carpet material;

collecting said first remnant carpet material;

running said collected remnant carpet material through a second cyclonic dehumidifying comminuter set at a high comminution level to separate the fractional components of said first remnant carpet material to create a mass of separated, entwined fractional component fibers discharged from a discharge opening of said comminuter;

filtering the air flow after being exhausted from said comminuter through a filtering mechanism to recovered fractional component fibers carried out of the comminuter with the air flow;

passing said mass of entwined fractional component fibers through a separating mechanism to separate the entwined fractional component fibers from said mass discharged from said comminuter; and collecting said fractional component fibers from said filtering mechanism and said separating mechanism.

9. The method of claim 8 wherein said conditioning step further includes the step of:

pre-soaking said carpet pieces in water before said feeding step.

10. The method of claim 9 further comprising the steps of:

recovering said backing material and stabilizer material from said first comminuter; and washing said first remnant carpet material to remove any powdery residue therefrom.

11. The method of claim 10 wherein said passing step includes the step of:

combing the mass of entwined fractional component fibers through a carding mechanism.

12. A method of separating and recovering fractional components of carpet, comprising the steps of:

conditioning said carpet by reducing said carpet to carpet pieces having a size within a pre-determined range of sizes;

feeding said carpet pieces into an air flow of a cyclonic dehumidifying comminuter to separate the fractional components of said carpet pieces to create a mass of separated, entwined fractional component fibers discharged from a discharge opening of said comminuter;

washing said entwined mass of component fibers to remove any powdery residue therefrom;

passing said mass of entwined fractional component fibers through a separating mechanism to separate the entwined fractional component fibers from said mass discharged from said comminuter; and collecting said fractional component fibers from said separating mechanism.

13. The method of claim 12 wherein said feeding step includes the step of:

setting the comminuter to a minimal comminution level to effect only a separation of a backing and stabilizer material from the carpet pieces to create a remnant carpet material.

14. The method of claim 13 further including the steps of:

after said feeding step, collecting the remnant carpet material; and running said collected remnant carpet material through a second cyclonic dehumidifying comminuter set at a high comminution level to separate the fractional component fibers and create said mass of entwined component fibers.

15. The method of claim 14 wherein said collecting step includes the step of:

screening said backing and stabilizer material from said remnant carpet material.

16. The method of claim 12 wherein said passing step includes the step of:

combing the mass of entwined fractional component fibers through a carding mechanism.

17. The method of claim 16 wherein said conditioning step further includes the step of:

pre-soaking said carpet pieces in water before said feeding step.

18. The method of claim 16 further comprising the step of:

before said passing step, washing said entwined mass of component fibers to remove any powdery residue therefrom.

19. The method of claim 18 further comprising the steps of:

setting the comminuter to a minimal comminution level to effect only a separation of a backing and stabilizer material from the carpet pieces to create a remnant carpet material;

after said feeding step, screening the backing and stabilizer material from said remnant carpet material and collecting the remaining remnant carpet material; and running said collected remaining remnant carpet material through a second cyclonic dehumidifying comminuter set at a high comminution level to separate the fractional component fibers and create said mass of entwined component fibers.

20. The method of claim 12 further comprising the steps of:

filtering the air flow after being exhausted from said comminuter through a filtering mechanism to recovered fractional component fibers carried out of the comminuter with the air flow; and collecting said fractional component fibers from said filtering mechanism.

* * * * *